UNITED STATES PATENT OFFICE.

ANDREW KELLY, OF LONDON, ENGLAND.

MANUFACTURE OF ACID SODIUM PYROPHOSPHATE.

1,383,990. Specification of Letters Patent. Patented July 5, 1921.

No Drawing. Application filed January 22, 1921. Serial No. 439,269.

*To all whom it may concern:*

Be it known that ANDREW KELLY, subject of the King of Great Britain, residing at 57 Chancery Lane, London, England, has invented certain new and useful Improvements in the Manufacture of Acid Sodium Pyrophosphate, for which I have filed an application in England, Jan. 5, 1920, of which the following is a specification.

This invention relates to the manufacture of acid sodium pyrophosphate.

According to this invention, acid sodium pyrophosphate is prepared by adding a calculated amount of an acid to sodium pyrophosphate and salting out to precipitate the acid sodium pyrophosphate.

In accordance with one convenient method of carrying out the invention, to a strong solution of sodium pyrophosphate ($Na_4P_2O_7$) is added the calculated amount of hydrochloric acid required to convert the whole of the normal salt present into acid sodium pyrophosphate according to the equation $Na_4P_2O_7 + 2HCl = Na_2H_2P_2O_7 + 2NaCl$.

After well mixing by stirring in a vessel, the solution is saturated with salt (sodium chlorid) and allowed to stand, acid sodium pyrophosphate which has thus been salted out is then collected on any suitable filter, freed as completely as possible from the mother liquor, and dried by any suitable means.

The material as thus prepared contains a small percentage of sodium chlorid, but if desired, practically the whole of this impurity may be removed by washing the precipitate with a saturated solution of acid sodium pyrophosphate.

What I claim is:—

1. The method of manufacturing an acid sodium pyrophosphate which comprises adding to sodium pyrophosphate an acid capable of converting same into acid sodium pyrophosphate, and precipitating said acid sodium pyrophosphate by salting out.

2. The method of manufacturing an acid sodium pyrophosphate which comprises adding to sodium pyrophosphate an acid capable of converting same into acid sodium pyrophosphate the amount of such acid being equivalent to the acidity of the resultant acid sodium pyrophosphate, and precipitating said acid sodium pyrophosphate by salting out.

3. The method of manufacturing an acid sodium pyrophosphate which comprises adding hydrochloric acid to sodium pyrophosphate, the amount of such hydrochloric acid being sufficient to convert the whole of the sodium pyrophosphate into sodium di-hydrogen pyrophosphate and sodium chlorid, and precipitating acid sodium pyrophosphate by salting out by means of the sodium chlorid formed during the reaction.

In testimony whereof I have hereunto set my hand in presence of two subscribing witnesses.

ANDREW KELLY.

Witnesses:
T. J. OSMAN,
C. J. DAY.